US012775235B2

(12) United States Patent
Takahashi et al.

(10) Patent No.: US 12,775,235 B2
(45) Date of Patent: Oct. 27, 2026

(54) CLEANING MEMBER, CLEANING DEVICE, REMOVABLE UNIT, AND IMAGE FORMING APPARATUS

(71) Applicant: FUJIFILM Business Innovation Corp., Tokyo (JP)

(72) Inventors: Tatsuya Takahashi, Kanagawa (JP); Naoya Mitamura, Kanagawa (JP); Akira Shimodaira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,116

(22) Filed: Mar. 3, 2023

(65) Prior Publication Data

US 2024/0103423 A1 Mar. 28, 2024

(30) Foreign Application Priority Data

Sep. 27, 2022 (JP) ................................ 2022-154050

(51) Int. Cl.
*G03G 21/00* (2006.01)

(52) U.S. Cl.
CPC ....... *G03G 21/0029* (2013.01); *G03G 21/007* (2013.01)

(58) Field of Classification Search
CPC ....................................... G03G 21/0011–0029
See application file for complete search history.

(56) References Cited

U.S. PATENT DOCUMENTS 7,123,872 B2 * 10/2006 Shakuto ............. G03G 21/0029 399/350
10,908,553 B1 * 2/2021 Watanabe .......... G03G 21/0011
2007/0201898 A1 * 8/2007 Mochizuki ......... G03G 15/1605 399/302

FOREIGN PATENT DOCUMENTS

| | | |
|---|---|---|
| JP | 10-260619 A | 9/1998 |
| JP | 2004-109587 A | 4/2004 |
| JP | 2007-127898 A | 5/2007 |
| JP | 2016-197191 A | 11/2016 |
| JP | 2017-181637 A | 10/2017 |

OTHER PUBLICATIONS

Communication dated Jul. 21, 2026, issued in Japanese Application No. 2022-154050.

* cited by examiner

*Primary Examiner* — Leon W Rhodes, Jr.
(74) *Attorney, Agent, or Firm* — Sughrue Mion, PLLC

(57) ABSTRACT

A cleaning member includes: an elastic contact plate that includes a distal end surface with a corner portion to be brought into contact with a cleaning target surface, which is moved with toner attached thereto, of a cleaning target body; and a support plate bonded to the elastic contact plate from a back surface side of the elastic contact plate to support the elastic contact plate, the support plate being more rigid than the elastic contact plate. The distal end surface of the elastic contact plate projects from a distal end surface of the support plate.

20 Claims, 11 Drawing Sheets

CLEANING MEMBER, CLEANING DEVICE, REMOVABLE UNIT, AND IMAGE FORMING APPARATUS

CROSS-REFERENCE TO RELATED APPLICATIONS

This application is based on and claims priority under 35 USC 119 from Japanese Patent Application No. 2022-154050 filed Sep. 27, 2022.

BACKGROUND

(i) Technical Field

The present disclosure relates to a cleaning member, a cleaning device, a removable unit, and an image forming apparatus.

(ii) Related Art

Japanese Unexamined Patent Application Publication No. 2017-181637 (claim 1 and FIG. 3) describes a cleaning blade for contact with a cleaning target member to be moved, the cleaning blade including a blade body portion that includes a distal end surface, a belly surface, a back surface, and a pair of side surfaces, and a blade projecting portion that includes an inclined surface that, when a direction in which the pair of side surfaces face each other is defined as a width direction, a direction in which the belly surface and the back surface face each other is defined as a thickness direction, and a direction that is orthogonal to the width direction and the thickness direction is defined as a height direction, is located at an end portion of the belly surface on the side of the distal end surface, projects outward in the thickness direction with respect to the belly surface, and is continuous with the distal end surface, the inclined surface starting at an end of the distal end surface on the side of the belly surface and being inclined outward in the thickness direction with respect to the belly surface and inward in the height direction with respect to the distal end surface, in which at least a part of the inclined surface constitutes a contact surface for contact with the cleaning target member.

Japanese Unexamined Patent Application Publication No. 2007-127898 (claim 1, paragraph [0135], and FIG. 1) describes a cleaning unit for an image forming apparatus, the cleaning unit removing untransferred residual toner from a surface of a photoconductor after image formation and including a distal end member that abuts against the photoconductor to remove the untransferred residual toner, a base member that holds the distal end member, and a holder that holds the base member, in which the distal end member and the base member are constituted of an elastic body with a hardness of 80 to 90 degrees according to JISA, the sectional shape at a position of connection of the distal end member and the base member is a corrugated shape which transforms curvilinearly as seen from a longitudinal direction of the distal end member and the base member, and the distal end member has a width of 3 to 5 mm and is held by the base member such that the distal end member projects by 0.5 to 1 mm from the base member in the direction of abutment with the photoconductor.

Japanese Unexamined Patent Application Publication No. 2007-127898 (claim 1, paragraph [0135], and FIG. 1) also describes an example in which the distal end member and the base member have a hardness of 90 degrees and 72 degrees, respectively, according to JISA (Examples 1, 4, and 5), an example in which the distal end member and the base member have a hardness of 85 degrees and 75 degrees, respectively, according to JISA (Example 2), an example in which the distal end member and the base member have a hardness of 80 degrees and 70 degrees, respectively, according to JISA (Example 3), and an example in which the distal end member and the base member have a hardness of 85 degrees and 70 degrees, respectively, according to JISA (Example 6).

SUMMARY

Aspects of non-limiting embodiments of the present disclosure relate to providing a cleaning member, a cleaning device, a removable unit, and an image forming apparatus that allow a part of the distal end surface of a plate-like cleaning member to keep in contact with a cleaning target surface, which is moved with toner attached thereto, of a cleaning target body in such a state that the distal end surface is not easily curled and cleaning performance is secured.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cleaning member including: an elastic contact plate that includes a distal end surface with a corner portion to be brought into contact with a cleaning target surface, which is moved with toner attached thereto, of a cleaning target body; and a support plate bonded to the elastic contact plate from a back surface side of the elastic contact plate to support the elastic contact plate, the support plate being more rigid than the elastic contact plate, in which the distal end surface of the elastic contact plate projects from a distal end surface of the support plate.

BRIEF DESCRIPTION OF THE DRAWINGS

An exemplary embodiment of the present disclosure will be described in detail based on the following figures, wherein.

DETAILED DESCRIPTION

Figure 1:
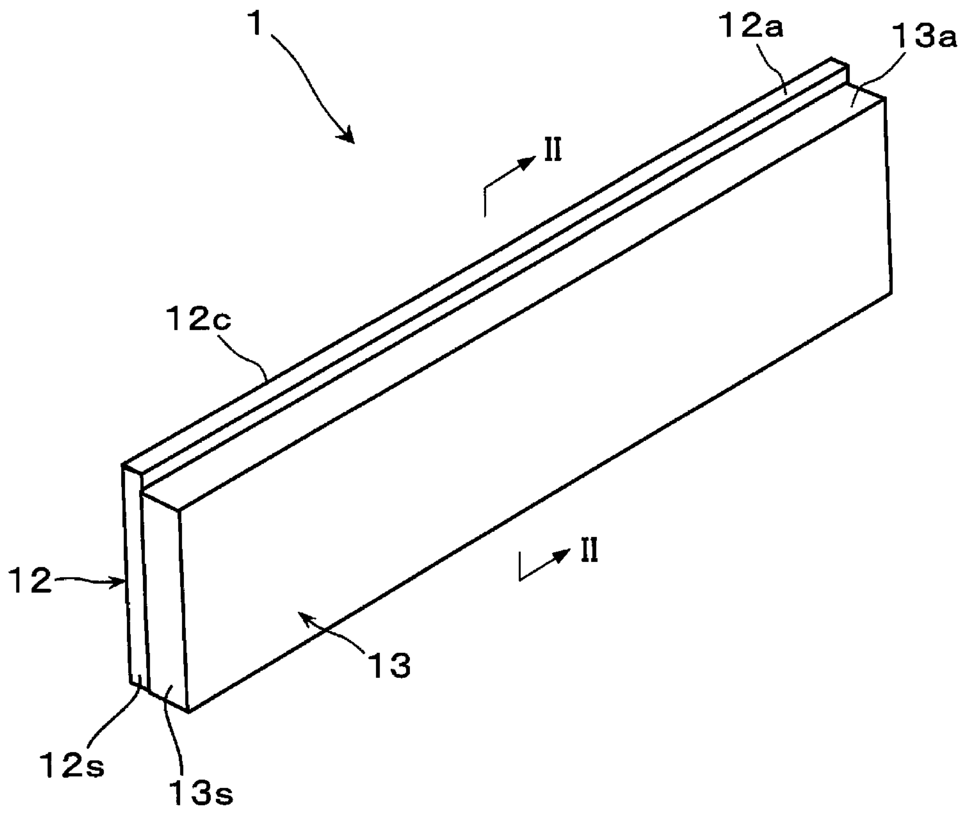
FIG. 1 is a schematic perspective view of a cleaning member according to a first exemplary embodiment.

An exemplary embodiment of the present disclosure will be described below.

First Exemplary Embodiment

A cleaning member 1, a cleaning device 2, an image forming apparatus 3, and a removable unit 7 according to a first exemplary embodiment are configured as described below.

(Cleaning Member)

The cleaning member 1 according to the first exemplary embodiment is a plate-like member that cleans a cleaning target surface 91, which is moved with toner attached thereto, of a cleaning target body 90 (see FIG. 3 etc.) by contacting the cleaning target surface 91 and scraping unnecessary toner. The cleaning member 1 is also referred to as a "cleaning blade". The unnecessary toner is toner to be removed from the cleaning target surface 91.

Figure 2:
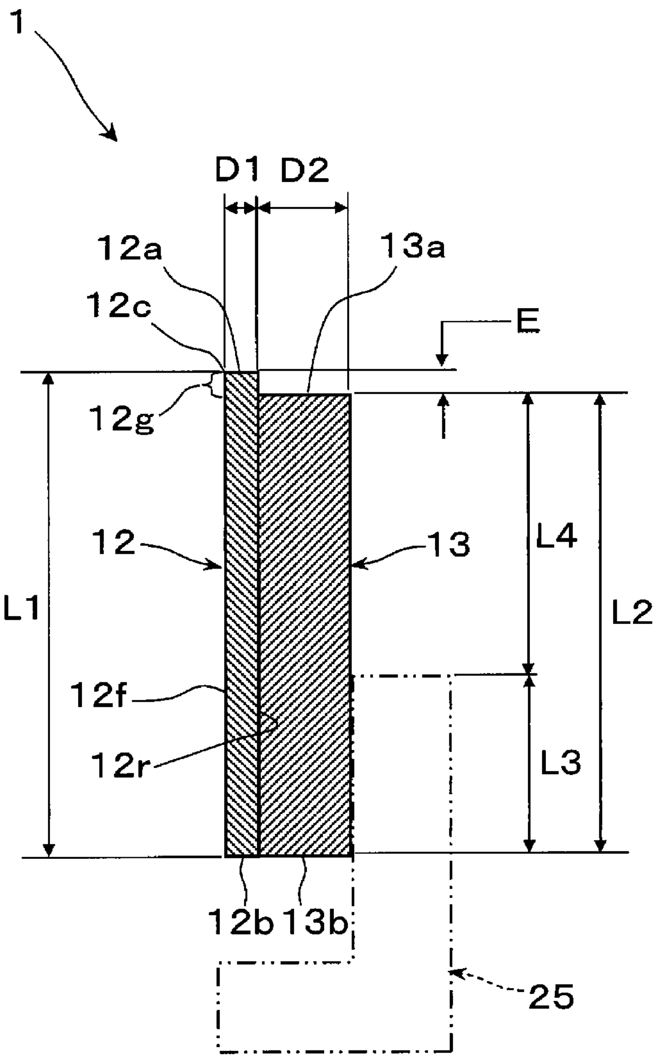
FIG. 2 is a cross-sectional view of the cleaning member in FIG. 1 taken along the line II-II.

As illustrated in FIGS. 1 and 2, the cleaning member 1 includes an elastic contact plate 12 and a support plate 13. Therefore, the cleaning member 1 is constituted as a member of a two-layer structure including the elastic contact plate 12 and the support plate 13.

Figure 3:
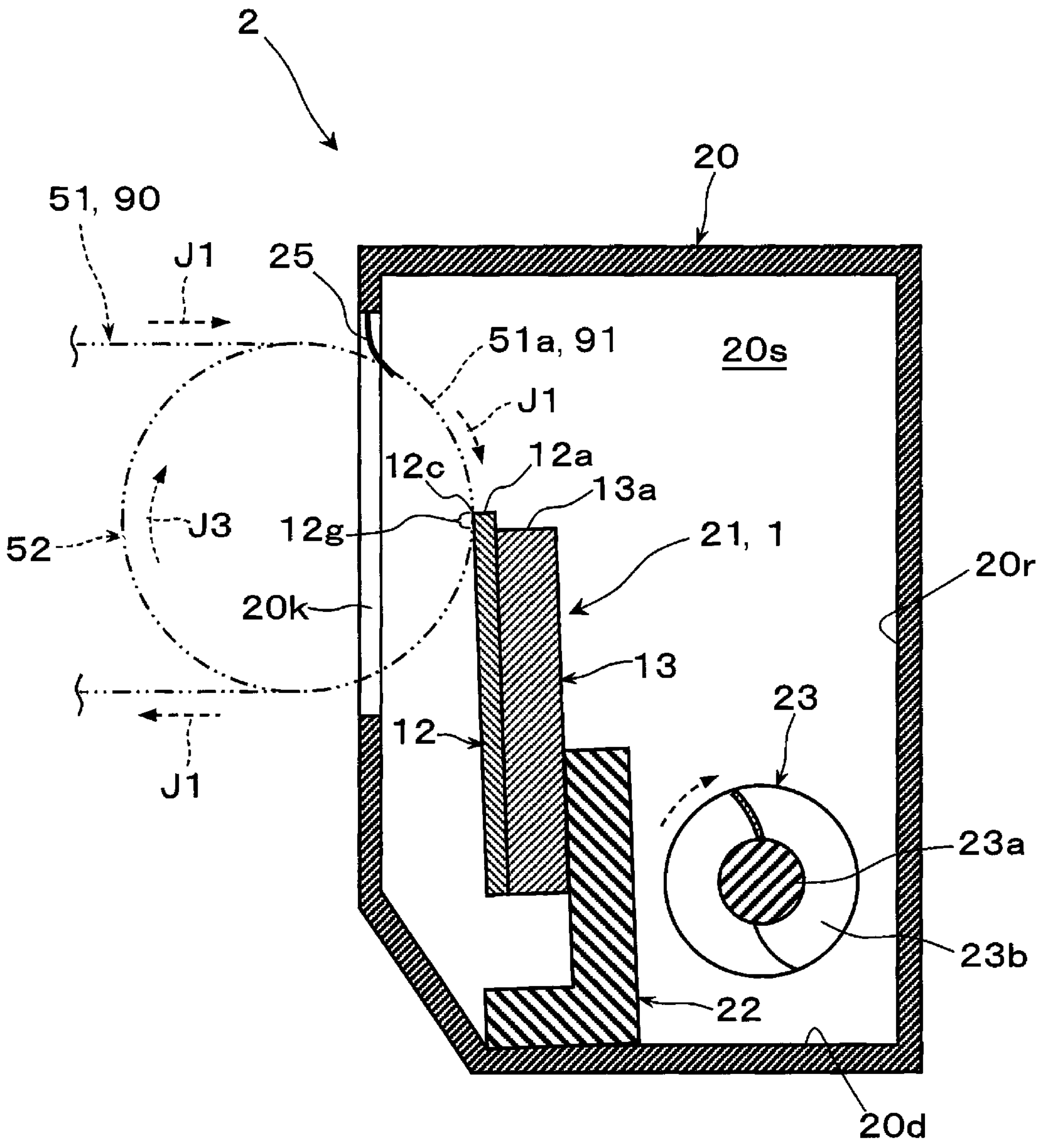
FIG. 3 illustrates an overview of a cleaning device according to the first exemplary embodiment.

The elastic contact plate 12 is a plate-like portion that includes a distal end surface 12*a* with a corner portion 12*c*, which first contacts the cleaning target surface 91 of the cleaning target body 90, as illustrated in FIG. 3 etc., when the elastic contact plate 12 is used for cleaning.

The elastic contact plate 12 according to the first exemplary embodiment is a plate member that has a horizontally long rectangular surface and a prescribed plate thickness D1, the surface having a prescribed length L1 and a width and extending in a direction that is substantially orthogonal to a direction (moving direction) J1 of movement of the cleaning target surface 91. The length L1 is the dimension of the elastic contact plate 12 as measured substantially along the moving direction J1. The width is the dimension of the elastic contact plate 12 as measured along a direction that is substantially orthogonal to the moving direction J1. The state of being "substantially orthogonal" indicates an intersecting state in which the angle of intersecting the moving direction J1 is the right angle (90°) or in a range within ±3° from the right angle.

As illustrated in FIG. 2, the elastic contact plate 12 includes a distal end surface 12*a* that faces the upstream side in the moving direction J1 (see FIG. 3) of the cleaning target surface 91 when the elastic contact plate 12 contacts the cleaning target surface 91, a rear end surface 12*b* located on the opposite side of the distal end surface 12*a*, a belly surface 12*f* that faces the downstream side in the moving direction J1 of the cleaning target surface 91, a back surface 12*r* located on the opposite side of the belly surface 12*f*, and a pair of side surfaces 12*s* (see FIG. 1) located at both ends in a direction that is substantially orthogonal to the moving direction J1.

The corner portion 12*c* of the distal end surface 12*a* is a portion of a side at which the distal end surface 12*a* and the belly surface 12*f* cross each other at the substantially right angle.

A plate thickness D1 of the elastic contact plate 12 is less than a plate thickness D2 of the support plate 13. The plate thickness D1 is 0.1 to 1 mm, and is preferably equal to or more than 0.1 times and less than 0.5 times the plate thickness D2, for example. In the case where the plate thickness D1 of the elastic contact plate 12 is equal to or more than the plate thickness D2 of the support plate 13, the elastic contact plate 12 and hence the cleaning member 1 is disadvantageously curled easily etc.

The elastic contact plate 12 is an elastic plate-like member. The elastic contact plate 12 may be constituted of a material such as polyurethane, silicon rubber, or butadiene rubber, for example.

The elastic contact plate 12 preferably has a Young's modulus of 5.0 MPa or more and 17.2 MPa or less. The Young's modulus is measured using a tensile testing machine (Strograph VE manufactured by Toyo Seiki Seisaku-sho, Ltd.) after the elastic contact plate 12 as a measurement target member is cut into a dumbbell shape.

The support plate 13 is a plate-like member bonded to the elastic contact plate 12 from the side of the back surface 12*r* to support the elastic contact plate 12. The support plate 13 is also a plate-like member that is more rigid than the elastic contact plate 12.

The support plate 13 according to the first exemplary embodiment is a plate member that has a horizontally long rectangular surface and a prescribed plate thickness D2, the surface having a prescribed length L2 and a width and extending in a direction that is substantially orthogonal to the moving direction J1 of the cleaning target surface 91.

The plate thickness D2 of the support plate 13 is more than the plate thickness D1 of the elastic contact plate 12. Consequently, the support plate 13 is easily constituted as a member that is more rigid than the elastic contact plate 12.

The support plate 13 is preferably an elastic plate-like member. The support plate 13 may be constituted of a material such as polyurethane or an epoxy resin, for example.

Since the support plate 13 is more rigid than the elastic contact plate 12, the Young's modulus of the support plate 13 is higher than the Young's modulus of the elastic contact plate 12. The Young's modulus of the support plate 13 is preferably 1.5 to 3.0 times the Young's modulus of the elastic contact plate 12. Consequently, the support plate 13 may appropriately support the elastic contact plate 12.

The support plate 13 supports the elastic contact plate 12 by having the elastic contact plate 12 bonded to one horizontally long rectangular surface of the support plate 13 from the side of the back surface 12*r*.

The support plate 13 and the elastic contact plate 12 are fabricated into the bonded state in the following manner, for example. That is, a material to constitute the support plate 13 is first poured into a draw forming machine to be draw-formed into a plate shape and partially cured, and a material to constitute the elastic contact plate 12 is poured onto one surface of the partially cured material to be draw-formed and cured in the same manner. The fabrication method is not limited thereto.

In the cleaning member 1, as illustrated in FIGS. 1 and 2, the elastic contact plate 12 is supported by the support plate 13 with the distal end surface 12a of the elastic contact plate 12 projecting from a distal end surface 13a of the support plate 13.

An amount of projection E of the distal end surface 12a of the elastic contact plate 12 is preferably less than the plate thickness D1 of the elastic contact plate 12 (E<D1). The amount of projection E is less than 0.5 mm, for example. In the case where the amount of projection E is equal to or more than the plate thickness D1 of the elastic contact plate 12, the distal end portion of the elastic contact plate 12 and hence the distal end portion of the cleaning member 1 is disadvantageously locally curled easily etc.

As illustrated in FIG. 2 etc., the elastic contact plate 12 according to the first exemplary embodiment is supported by the support plate 13 with the rear end surface 12b aligned (flush) with a rear end surface 13b of the support plate 13 and with the side surfaces 12s aligned with side surfaces 13s of the support plate 13.

The cleaning member 1 described above is used in the state of being held in such a posture that the corner portion 12c of the distal end surface 12a first contacts the cleaning target surface 91 with the distal end surface 12a facing the cleaning target surface 91 in the moving direction J1 (see FIG. 3). The cleaning member 1 is used with the corner portion 12c of the distal end surface 12a contacting the cleaning target surface 91 along a direction that is substantially orthogonal to the moving direction J1 of the cleaning target surface 91.

The cleaning target body 90 to be cleaned using the cleaning member 1 may be any object that is moved with unnecessary toner to be removed attached thereto and that includes the cleaning target surface 91 to be effectively cleaned through contact with the cleaning member 1.

The toner is a material that constitutes a dry developer. The toner contains a body (principal body) in a fine particulate form and an external additive such as a lubricant that is finer than the body.

(Cleaning Device)

As illustrated in FIG. 3, the cleaning device 2 according to the first exemplary embodiment includes a housing 20, and a plate-like cleaning member 21, a holding member 22, etc. disposed inside the body 20.

The housing 20 has an internal storage space 20s that stores waste toner etc. scraped by the cleaning member 21 and that stores the cleaning member 21 etc. disposed therein, and a cleaning opening portion 20k provided to face the cleaning target surface 91 of the cleaning target body 90. The housing 20 also includes a seal material 25 provided at the cleaning opening portion 20k to prevent leakage of waste toner. The seal material 25 may be a member such as a film.

The plate-like cleaning member 21 is a plate-like member that cleans the cleaning target surface 91 of the cleaning target body 90 by scraping unnecessary toner attached to the cleaning target surface 91 by contacting the cleaning target surface 91. The cleaning member 21 may be the cleaning member 1 discussed earlier.

The holding member 22 is a member that holds the cleaning member 21 inside the housing 20 such that a corner portion 21c of a distal end surface 21a of the cleaning member 21 contacts the cleaning target surface 91.

In practice, the cleaning member 21 corresponds to the cleaning member 1, and the corner portion 21c of the distal end surface 21a of the cleaning member 21 corresponds to the corner portion 12c of the distal end surface 12a of the elastic contact plate 12 of the cleaning member 1.

The holding member 22 according to the first exemplary embodiment is shaped to have a holding portion that holds the cleaning member 1 attached thereto, and is formed from a material such as metal, for example. The holding member 22 is fixed to a bottom surface 20d of the storage space 20s inside the housing 20 directly or via an attachment portion, for example.

Figure 4:
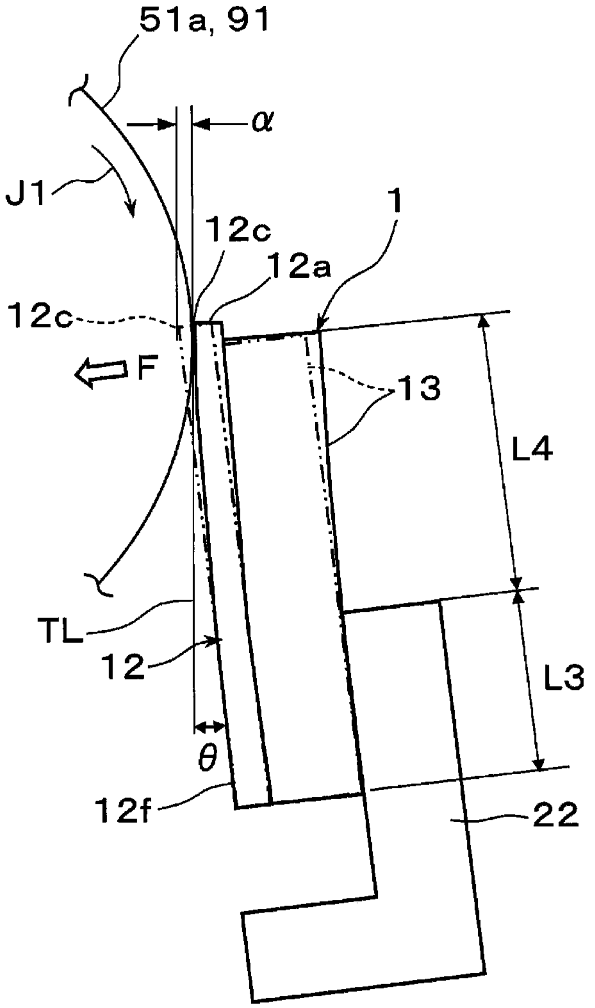
FIG. 4 schematically illustrates the state of contact of the cleaning member of the cleaning device in FIG. 3 with a cleaning target surface.

As illustrated in FIG. 4, the holding member 22 holds the support plate 13 of the cleaning member 1 with a rear-end portion of the support plate 13 for a prescribed length L3 in close contact with the holding member 22. Consequently, the support plate 13 of the cleaning member 1 is used as held with a portion of the support plate 13 on the distal side for a length L4, which is obtained by subtracting the length L3 of the rear-end portion held by the holding member 22 from the overall length L2, left as a non-held portion (free portion) not held by the holding member 22.

As illustrated in FIG. 4, the holding member 22 holds the rear-end portion of the support plate 13 of the cleaning member 1 such that the cleaning member 1 is at a prescribed set angle $\theta$ with respect to the cleaning target surface 91 and interferes with the cleaning target surface 91 with a prescribed amount of interference a and a prescribed pressing force F, for example.

The set angle $\theta$ of the cleaning member 1 is an angle (acute angle) formed between the belly surface 12f of the elastic contact plate 12 and the cleaning target surface 91 (tangential line TL at the position of contact in the case where the cleaning target surface 91 is a curved surface) when the distal end surface 12a faces the distal end surface 91 in the moving direction J1. The set angle $\theta$ is set in the range of 5° or more and 30% or less, for example.

In design, the amount of interference a of the cleaning member 1 is the amount (length) of interference of the corner portion 12c of the elastic contact plate 12 with the cleaning target surface 91 at the time when it is assumed that the cleaning member 1 is mounted at the set angle $\theta$ and the distal-end portion of the support plate 13 of the cleaning member 1 is not elastically deformed to be warped (the state indicated by the double-dashed line in FIG. 4). The amount of interference a is set in the range of 0.5 mm or more and 1.5 mm or less, for example.

The pressing force F of the cleaning member 1 is the force with which the cleaning member 1 (the corner portion 12c of the elastic contact plate 12) is pressed against the cleaning target surface 91. The pressing force F is set in the range of 1 gf/mm or more and 2 gf/mm or less, for example.

As illustrated in FIG. 3, the cleaning device 2 includes a transport member 23 provided inside the housing 20 to transport waste toner scraped by the cleaning member 1 and stored in the storage space 20s.

The transport member 23 is installed in a lower portion of the storage space 20s between the cleaning member 1 and a back surface wall 20r of the housing 20. The transport member 23 transports waste toner to be fed to the outside of the housing 20 and toward a collection container 35 (see FIG. 4) that collects waste toner, for example.

The transport member 23 may be a screw auger composed of a rotary shaft 23a disposed along a direction of transfer in the storage space 20s inside the housing 20, and a transport blade 23b provided spirally around the outer peripheral surface of the rotary shaft 23a, for example.

The cleaning device 2 may not include the transport member 23.

(Cleaning Operation of Cleaning Device)

When the cleaning device 2 described above is used, as illustrated in FIG. 3, the housing 20 is disposed such that the cleaning opening portion 20k faces the cleaning target surface 91 of the cleaning target body 90 to be cleaned, and the cleaning member 1 is disposed in contact with the cleaning target surface 91, which is located at the cleaning opening portion 20k, in the state described above.

When the cleaning device 2 is used, as illustrated in FIG. 4, the corner portion 12c of the distal end surface 12a of the elastic contact plate 12 of the cleaning member 1 is first placed in contact with the cleaning target surface 91 of the cleaning target body 90 which is moved in the moving direction J1.

Figure 5A:
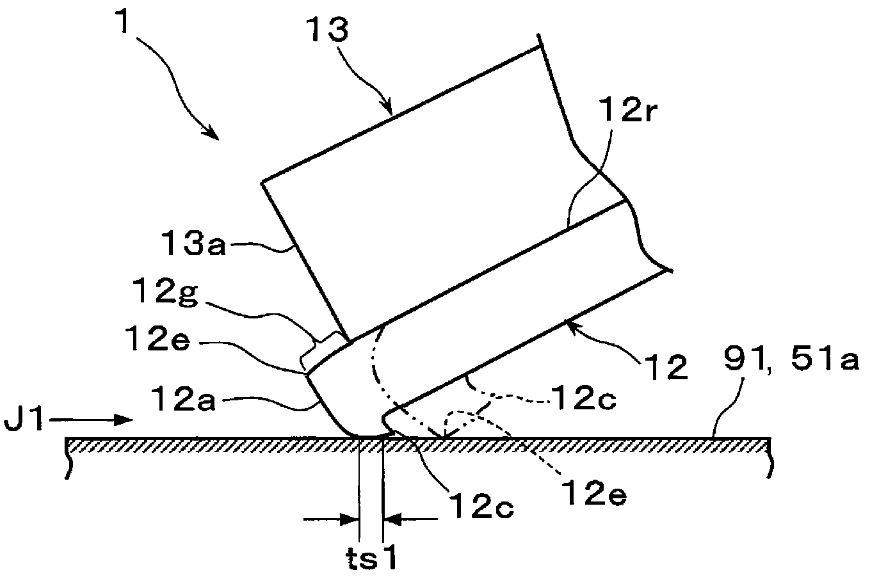
FIG. 5A schematically illustrates the state of the cleaning member during cleaning as enlarged.

In this event, as illustrated as enlarged in FIG. 5A, a part, i.e. a portion that is close to the corner portion 12c, of the distal end surface 12a of the elastic contact plate 12 contacts the cleaning target surface 91 as elastically deformed in the state of being distorted so as to be drawn downstream in the moving direction J1 by a friction force (drawing force) generated through contact with the cleaning target surface 91 being moved.

Consequently, a portion that is close to the corner portion 12c, which is a part of the distal end surface 12a of the elastic contact plate 12, keeps in contact with the cleaning target surface 91 over a prescribed contact width ts1. The contact width ts1 is about 1 m to 100 μm, for example.

The state in which a part of the distal end surface 12a of the elastic contact plate 12 of the cleaning member 1 contacts the cleaning target surface 91 over the prescribed contact width ts1 corresponds to a state in which cleaning performance is secured, and is also referred to as a tagged state, for example. The part of the distal end surface 12a of the elastic contact plate 12 returns to the original shape from the elastically deformed state described above when the cleaning target surface 91 is stopped and stationary.

The reason that the portion of the distal end surface 12a of the elastic contact plate 12 is elastically deformed to contact the cleaning target surface 91 over the prescribed contact width ts1 is assumed to be as follows.

That is, the distal end surface 12a of the elastic contact plate 12 projects from the distal end surface 13a of the support plate 13 by the prescribed amount of projection E, and therefore the above contact is assumed to be because a portion 12g of the elastic contact plate 12 that projects from the distal end surface 13a of the support plate 13 is not supported or fixed by the support plate 13 from the side of the back surface (12r) as illustrated in FIG. 5A and is suitably elastically deformable.

Figure 5B:
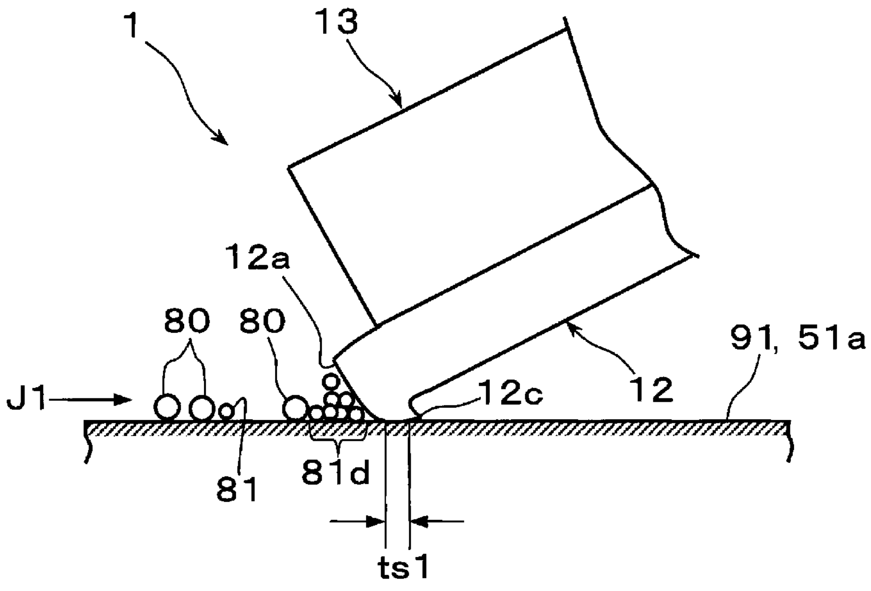
FIG. 5B schematically illustrates the state of cleaning by the cleaning member in FIG. 5A as enlarged.

As a result, as illustrated in FIG. 5B, the toner 80 attached to the cleaning target surface 91 is blocked and scraped by the distal end surface 12a of the elastic contact plate 12 of the cleaning member 1 in the cleaning device 2. The toner 80 scraped by the cleaning member 1 falls in the storage space 20s of the housing 20 to be stored as waste toner.

In the cleaning device 2, an external additive 81 attached to the toner 80 is blocked by the distal end surface 12a of the elastic contact plate 12 to form an external additive mass 81d that resides so as to form a dam.

Consequently, in the cleaning device 2, the toner 80 blocked by the distal end surface 12a of the elastic contact plate 12 of the cleaning member 1 is inhibited from slipping through a gap between the elastic contact plate 12 and the cleaning target surface 91 by the external additive mass 81d.

In the cleaning device 2, a part of the external additive mass 81d is supplied to a gap between a portion of the distal end surface 12a of the elastic contact plate 12 that contacts the cleaning target surface 91 and the cleaning target surface 91 to function as a lubricant.

Consequently, in the cleaning device 2, the friction force between the elastic contact plate 12 of the cleaning member 1 and the cleaning target surface 91 is reduced, which suppresses an increase in the action of the portion of the distal end surface 12a of the elastic contact plate 12 being drawn downstream in the moving direction J1 by the cleaning target surface 91 being moved. As a result, a distal-end portion including the distal end surface 12a of the elastic contact plate 12 is inhibited from being curled.

The curl of the cleaning member 1 is a phenomenon in which the elastic contact plate 12 is elastically deformed to such a degree that a second corner portion 12e (a portion at a side at which the distal end surface 12a and the back surface 12r cross each other), which is opposite to the corner portion 12c, of the distal end surface 12a of the elastic contact plate 12 contacts the cleaning target surface 91 as indicated by the double-dashed line in FIG. 5A.

In the cleaning device 2, by suppressing occurrence of such curl, cleaning performance is easily secured with the cleaning member 1 continuously maintained in the state of contacting the cleaning target surface 91 over the prescribed contact width ts1. In the cleaning device 2 including the cleaning member 1, a state in which curl of the cleaning member 1 is not caused easily is maintained even in the case where the amount of unnecessary toner located on the cleaning target surface 91 is relatively small. Examples of the case where the amount of unnecessary toner is relatively small include a case where operation to form an image with a low image density, or in other words operation to form an image using a small amount of toner, is performed continuously.

In the cleaning device 2, the elastic contact plate 12 of the cleaning member 1 projects with respect to the support plate 13, but is supported from the back surface 12r by the support plate 13 which is more rigid than the elastic contact plate 12.

Consequently, in the cleaning member 1 of the cleaning device 2, a part of the distal end surface 12a of the elastic contact plate 12 may be kept in contact with the cleaning target surface 91 of the cleaning target body 90 being moved, in the state in which the elastic contact plate 12 is not easily curled and cleaning performance is secured.

Figure 11A:
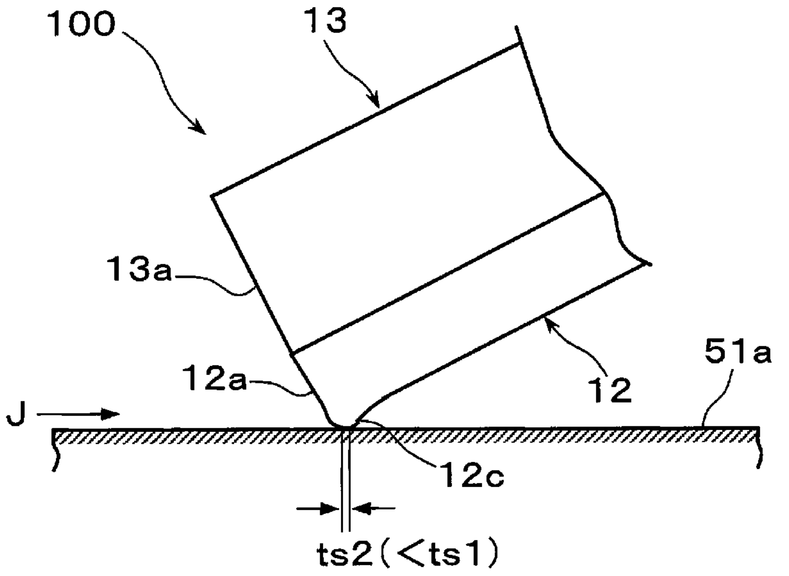
FIG. 11A schematically illustrates the state of contact of a cleaning member according to a comparative example during cleaning as enlarged.

For reference, the following disadvantage is caused in the case where the cleaning member 1 of the cleaning device 2 is replaced with a cleaning member 100 according to a comparative example, in which the distal end surface 12a of the elastic contact plate 12 is flush with the distal end surface 13a of the support plate 13, rather than projecting therefrom, as illustrated in FIG. 11A.

That is, in the cleaning member 100 according to the comparative example, as illustrated in FIG. 11A, a contact width ts2 between the distal end surface 12a and the cleaning target surface 91 is less than the contact width ts1 for the cleaning member 1 when the corner portion 12c of the distal end surface 12a of the elastic contact plate 12 is caused to contact the cleaning target surface 91 being moved. Therefore, in the cleaning member 100, a portion that is close to the corner portion 12c, which is a part of the distal end surface 12a of the elastic contact plate 12, may not be kept in sufficient contact with the cleaning target surface 91.

This is considered to be because the elastic contact plate 12 is supported by the support plate 13, which is more rigid than the elastic contact plate 12, to the back surface side of the distal end surface 12a. That is, it is assumed that such support enhances the rigidity of the distal-end portion of the elastic contact plate 12 on the side of the distal end surface 12*a*, and that the elastic contact plate 12 is not suitably elastically deformed even upon receiving the action of being drawn downstream in the moving direction J1 of the cleaning target surface 91.

Figure 11B:
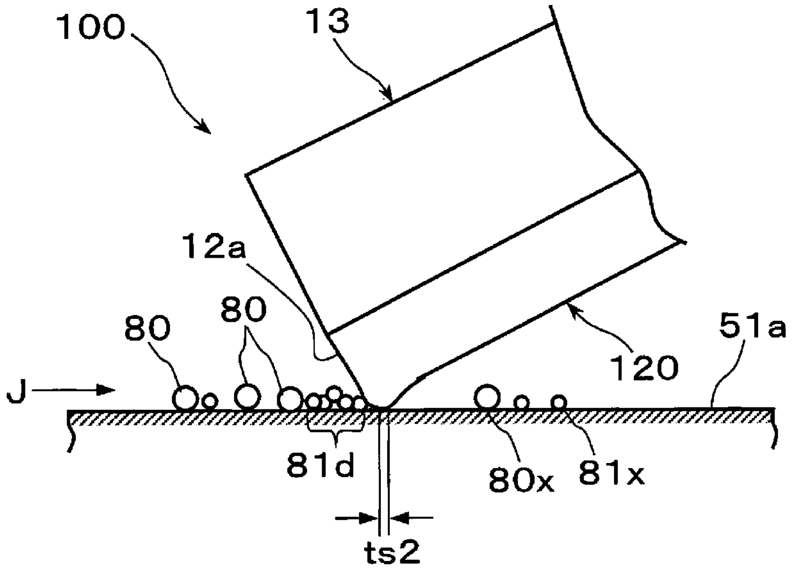
FIG. 11B schematically illustrates the state of cleaning by the cleaning member in FIG. 11A as enlarged.

As a result, with the cleaning member 100 according to the comparative example, as illustrated in FIG. 11B, the external additive mass 81*d* is not easily formed, and cleaning performance is not easily secured, as a part 80*x* of the toner 80 slips through a gap between the cleaning member 100 and the cleaning target surface 91 together with a part 81*x* of the external additive 81.

(Image Forming Apparatus)

Figure 6:
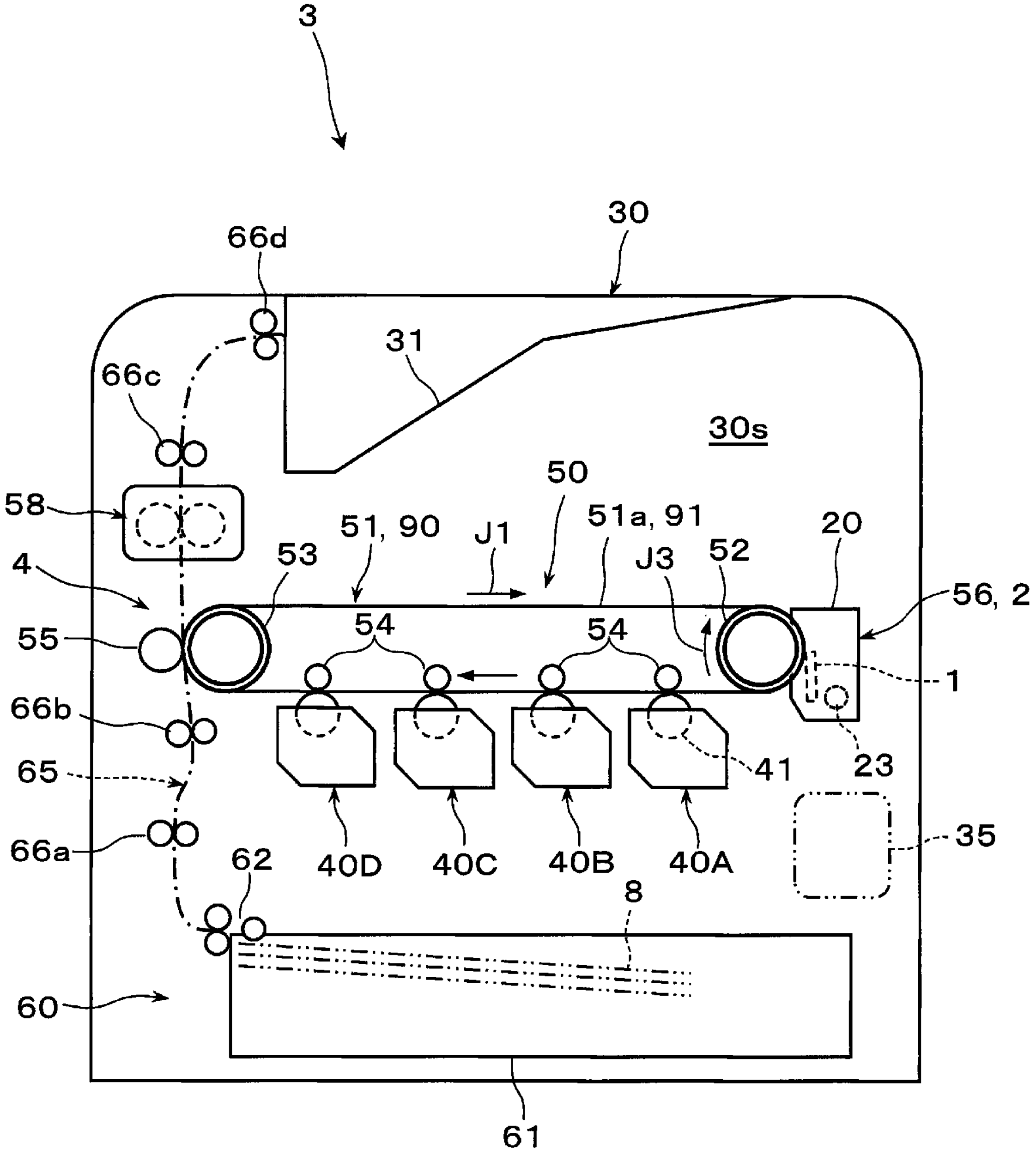
FIG. 6 illustrates an overview of an image forming apparatus according to the first exemplary embodiment.

The image forming apparatus 3 according to the first exemplary embodiment is a device that forms an image composed of the toner 80, and includes a body 30, an image forming portion 4 disposed inside the body 30, the cleaning device 2 described above, etc., as illustrated in FIG. 6.

The body 30 includes an internal storage space 30*s* in which the image forming portion 4, the cleaning device 2, etc. are stored and disposed, an ejection storage portion 31 that stores a recording medium 8 on which an image has been formed and which has been ejected thereto, etc. The ejection storage portion 31 is provided as a slope recessed obliquely at the upper surface portion of the body 30. The body 30 is formed in a box shape using materials such as a structural frame and exterior materials.

The image forming portion 4 is a portion that forms an image composed of the toner 80 on the recording medium 8.

The image forming portion 4 according to the first exemplary embodiment is constituted from an imaging unit 40 that forms a toner image composed of the toner 80, an intermediate transfer unit 50 that relays and transfers the toner image formed by the imaging unit 40 to the recording medium 8, a fixing device 58 that fixes the toner image transferred to the recording medium 8 to the recording medium 8, and a medium supply unit 60 that stores and supplies the recording medium 8.

The imaging unit 40 is constituted from four imaging units 40A, 40B, 40C, 40D that exclusively form toner images in four colors (yellow, magenta, cyan, black) composed of toner in such colors, for example.

The four imaging units 40A, 40B, 40C, 40D are disposed in line in the storage space 30*s* of the body 30.

While the imaging units 40A, 40B, 40C, 40D use toner in the four different colors mentioned above, the imaging units 40A, 40B, 40C, 40D are otherwise configured substantially in the same manner.

Figure 7:
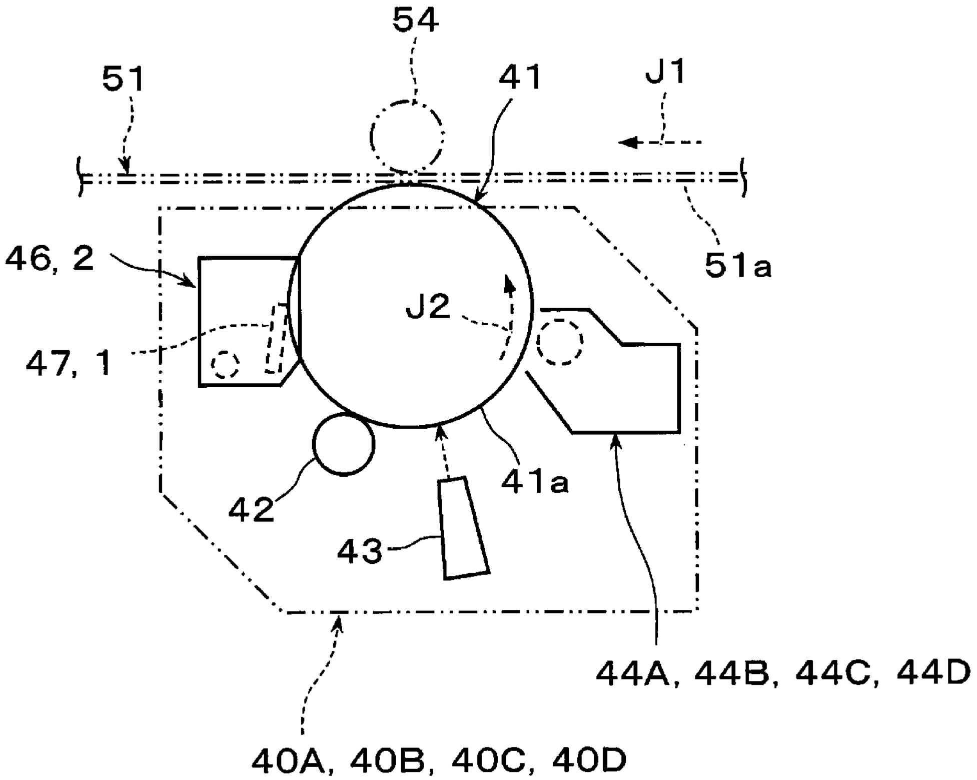
FIG. 7 illustrates an overview of an imaging unit of the image forming apparatus in FIG. 6.

That is, as illustrated in FIG. 7, the imaging units 40A, 40B, 40C, 40D include a drum-shaped photoconductor 41 as an example of an image holding member, and devices such as a charging device 42, a latent image forming device (image exposure device) 43, a developing device 44A, 44B, 44C, 44D, and a cleaning device 46 disposed around the photoconductor 41.

The photoconductor 41 is an image holding member that includes an image holding surface 41*a* that includes a photosensitive layer and holds a toner image, and is rotated in a direction indicated by an arrow J2.

The latent image forming device 43 is a device that forms an electrostatic latent image by exposing the image holding surface 41*a* that has been charged by the photoconductor 41 to light on the basis of image information. The latent image forming device 43 operates upon receiving an image signal generated when image information input from the outside is subjected to a prescribed process performed by an image processing unit (not illustrated) etc.

The developing device 44A, 44B, 44C, 44D exclusively uses toner in one of the four colors mentioned above. The toner may be a two-part developer containing a toner and a carrier, for example.

The cleaning device 46 includes a cleaning member 47 that cleans the image holding surface 41*a* by contacting the image holding surface 41*a* of the photoconductor 41 having passed through a first transfer position and scraping toner.

The intermediate transfer unit 50 is constituted by disposing devices such as an intermediate transfer body 51 in the shape of an endless belt, support rollers 52, 53 that rotatably support the intermediate transfer body 51, first transfer rollers 54, a second transfer roller 55, and a cleaning device 56.

The intermediate transfer body 51 is an endless belt that includes an image holding surface 51*a* that holds toner images in various colors formed by the imaging units 40A, 40B, 40C, 40D. The intermediate transfer body 51 is moved cyclically in the moving direction indicated by an arrow J1 by the support rollers 52, 53 which are rotated in a direction indicated by an arrow J3.

The first transfer rollers 54 are each a transfer device that is rotated while pressing the intermediate transfer body 51 against the photoconductor 41 of the imaging unit 40A, 40B, 40C, 40D at a position (first transfer position) at which the intermediate transfer body 51 faces the photoconductor 41. The first transfer rollers 54 perform a first transfer in which the toner image formed on the photoconductor 41 is transferred to the image holding surface 51*a* of the intermediate transfer body 51.

The second transfer roller 55 is a transfer device that is rotated while pressing the intermediate transfer body 51 against the support roller 53 at a position (second transfer position) at which the intermediate transfer body 51 faces the support roller 53. The second transfer roller 55 performs a second transfer in which the toner images that have been transferred to the intermediate transfer body 51 through the first transfer are collectively transferred to the recording medium 8.

The cleaning device 56 is a device that cleans the image holding surface 51*a* by contacting the image holding surface 51*a* (specifically, belt outer peripheral surface) of the belt-shaped intermediate transfer body 51 that has passed through the second transfer position and scraping toner.

The cleaning device 56 may be the cleaning device 2 discussed above (see FIG. 3).

Therefore, in the image forming apparatus 3, the cleaning target body 90 to be cleaned by the cleaning device 56 which is composed of the cleaning device 2 corresponds to the belt-shaped intermediate transfer body 51, and the cleaning target surface 91 corresponds to the image holding surface 51*a* of the intermediate transfer body 51. As illustrated in FIG. 6, the cleaning device 56 includes the housing 20, the cleaning member 1, the holding member 22, etc., as with the cleaning device 2. In the cleaning device 56, as illustrated in FIGS. 3 and 6, the cleaning member 1 is disposed so as to contact a portion of the intermediate transfer body 51 wound around the support roller 52.

The fixing device 58 is a device that fixes the toner image that has been transferred through the second transfer at the second transfer position of the intermediate transfer unit 50 to the recording medium 8.

The fixing device 58 is constituted by disposing devices such as a heating rotary member and a pressurizing rotary member in the internal space of a housing provided with an introduction port and an ejection port for the recording medium 8. A portion of the fixing device 58 at which the heating rotary member and the pressurizing rotary member are in press contact with each other serves as a fixing nip part at which a fixing process is performed.

The medium supply unit 60 is a device that stores and feeds recording media 8 of a prescribed size to be supplied to the second transfer position of the intermediate transfer unit 50. The medium supply unit 60 is constituted by disposing devices such as a storage body 61 that stores the recording media 8 and a feed device 62 that feeds the recording media 8, one medium at a time.

The recording media 8 may be any medium such as regular paper, coated paper, cardboard, and envelopes that may be stored and transported inside the body 30 and that enable transfer and fixation of toner images, and the material, form, etc. of the recording media 8 are not specifically limited.

The dot-and-dash line denoted by reference sign 65 in FIG. 6 indicates a principal transport path through which the recording medium 8 is transported inside the body 30. The transport path is constituted by disposing a plurality of transport rollers 66*a*, 66*b*, 66*c*, 66*d* that hold and transport the recording medium 8, a plurality of guide members (not illustrated) that secure a space for transport of the recording medium 8 and guide the recording medium 8 being transported, etc.

Operation of the image forming apparatus 3 to form a multi-color image is performed as follows, for example.

The multi-color image to be formed in the following description is a so-called full-color image constituted by combining toner in four colors including yellow, magenta, cyan, and black.

In the image forming apparatus 3, first, the imaging units 40A, 40B, 40C, 40D and the intermediate transfer unit 50 of the image forming portion 4 execute charging operation, exposure operation, developing operation, transfer operation, cleaning operation, etc. when a control unit (not illustrated) receives an instruction for operation to form an image. In the image forming apparatus, 3, meanwhile, the medium supply unit 60 of the image forming portion 4 executes operation to supply the recording medium 8 to the second transfer position.

Consequently, in the image forming apparatus 3, toner images in predetermined colors are formed on the respective drum-shaped photoconductors 41 of the imaging units 40A, 40B, 40C, 40D. In the image forming apparatus 3, the toner images in the respective colors are transferred to the belt-shaped intermediate transfer body 51 of the intermediate transfer unit 50 through a first transfer, and thereafter transferred to the recording medium 8 supplied to the second transfer position by way of the transport path 65 through a second transfer.

In the image forming apparatus 3, subsequently, fixing operation in which the recording medium 8 to which the toner images have been transferred through the second transfer is introduced to pass through the fixing nip part at which the heating rotary member and the pressurizing rotary member contact each other is executed in the fixing device 58.

Consequently, in the image forming apparatus 3, unfixed toner images are heated under pressurization to be fixed to the recording medium 8. The recording medium 8 after the fixation is ejected to the ejection storage portion 31 by way of the transport path 65 to be stored.

Basic operation of the image forming apparatus 3 to form a multi-color image on one surface of a single recording medium 8 is completed through the operation described above.

In the image forming apparatus 3, the image holding surface 51*a*, which is the cleaning target surface 91, of the belt-shaped intermediate transfer body 51 of the intermediate transfer unit 50 is cleaned by the cleaning device 56, which is composed of the cleaning device 2 (see FIG. 3).

In the cleaning device 2, cleaning may be performed with a part (a portion that is close to the corner portion 12*c*) of the distal end surface 12*a* of the elastic contact plate 12 of the cleaning member 1 kept in contact with the image holding surface 51*a* of the intermediate transfer body 51 being moved, in the state in which the elastic contact plate 12 is not easily curled and cleaning performance is secured, as discussed above (see FIG. 5).

(Removable Unit)

Figure 8A:
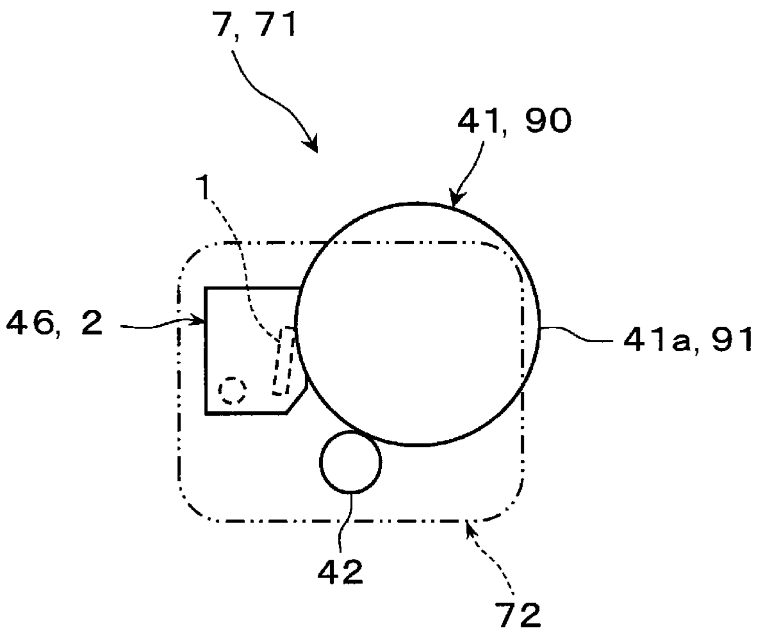
FIG. 8A illustrates an overview of an example of a removable unit that includes the cleaning device.

The removable unit 7 according to the first exemplary embodiment is constituted as a removable process unit 71 in which a portion of the imaging unit 40A, 40B, 40C, 40D of the image forming apparatus 3 is removably mounted to the body 30 and finally to the imaging unit 40 as illustrated in FIG. 8A, for example.

The removable process unit 71 according to the first exemplary embodiment is constituted as a unit (or a cartridge) in which the drum-shaped photoconductor 41, the charging device 42, and the cleaning device 46 are integrally attached to a support frame 72.

In the removable process unit 71, the cleaning device 2 discussed above is used as the cleaning device 46 for the drum-shaped photoconductor 41.

Therefore, in the removable process unit 71, the cleaning target body 90 to be cleaned by the cleaning device 2 corresponds to the drum-shaped photoconductor 41, and the cleaning target surface 91 corresponds to the image holding surface (specifically, drum outer peripheral surface) 41*a* of the photoconductor 41. As illustrated in FIG. 8A, the cleaning device 46 includes the housing 20, the cleaning member 1, the holding member 22, etc., as with the cleaning device 2. In the cleaning device 46, as illustrated in FIG. 8A, the cleaning member 1 is disposed so as to contact a portion of the image holding surface 41*a* of the photoconductor 41 after transfer operation and before charging operation.

The removable process unit 71 is constituted such that the removable process unit 71 alone is drawn forward of the body 30 of the image forming apparatus 3 to be removed, or such that the removable process unit 71 is removed after a part of the corresponding imaging unit 40 is drawn forward of the body 30, for example.

In the removable process unit 71 as an example of the removable unit 7 including the cleaning device 2, a part (a portion that is close to the corner portion 12*c*) of the distal end surface 12*a* of the elastic contact plate 12 of the cleaning member 1 of the cleaning device 2 may be kept in contact with the image holding surface 41*a* of the photoconductor 41, in the state in which the elastic contact plate 12 is not easily curled and cleaning performance is secured.

(Modifications of Removable Unit)

It is only necessary that the removable process unit 71 should include at least the cleaning device 2 and the cleaning target body 90 to be cleaned by the cleaning device 2.

Therefore, the removable process unit 71 may not include the charging device 42. The removable process unit 71 may include the latent image forming device 43 or the developing device 44 (any of A, B, C, and D), in addition to the cleaning device 2 and the photoconductor 41 as the cleaning target body 90.

Figure 8B:
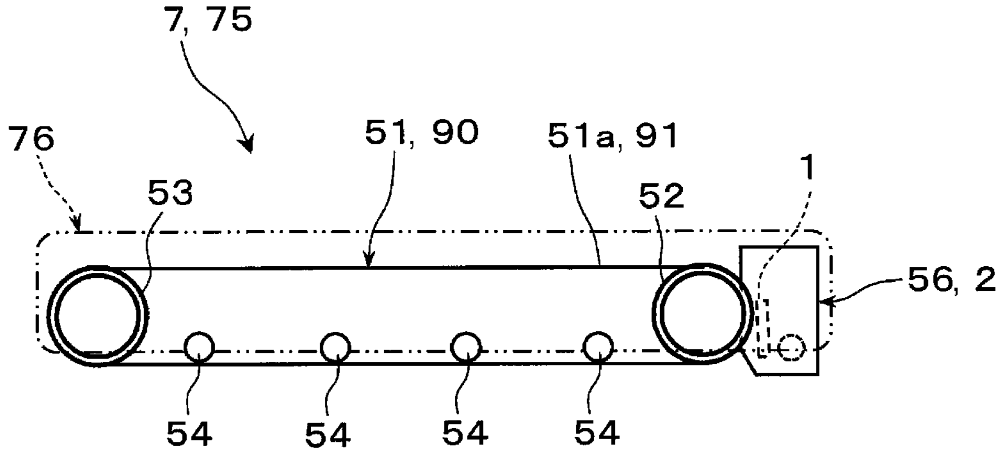
FIG. 8B illustrates an overview of another example of the removable unit that includes the cleaning device.

The removable unit 7 is constituted as a removable transfer unit 75 in which a portion of the intermediate transfer unit 50 of the image forming apparatus 3 is removably mounted to the body 30 (and finally to the intermediate transfer unit 50), as illustrated in FIG. 8B.

The removable transfer unit 75 according to the first exemplary embodiment is constituted as a unit (or a cartridge) in which the belt-shaped intermediate transfer body 51, the support rollers 52, 53, the first transfer rollers 54, and the cleaning device 56 are integrally attached to a support frame 76.

In the removable transfer unit 75, the cleaning device 2 discussed above is used as the cleaning device 56 for the belt-shaped intermediate transfer body 51. Therefore, in the removable transfer unit 75, the cleaning target body 90 to be cleaned by the cleaning device 2 corresponds to the belt-shaped intermediate transfer body 51, and the cleaning target surface 91 corresponds to the image holding surface (specifically, belt outer peripheral surface) 51*a* of the intermediate transfer body 51.

The removable transfer unit 75 is constituted such that the removable transfer unit 75 alone is drawn forward of the body 30 of the image forming apparatus 3 to be removed, or such that the removable transfer unit 75 is removed after a part or all of the intermediate transfer unit 50 is drawn forward of the body 30, for example.

In the removable transfer unit 75 as another example of the removable unit 7 including the cleaning device 2, a part (a portion that is close to the corner portion 12*c*) of the distal end surface 12*a* of the elastic contact plate 12 of the cleaning member 1 of the cleaning device 2 may be kept in contact with the image holding surface 51*a* of the intermediate transfer body 51, in the state in which the elastic contact plate 12 is not easily curled and cleaning performance is secured.

It is only necessary that the removable transfer unit 75 should include at least the cleaning device 2 and the cleaning target body 90 to be cleaned by the cleaning device 2.

Therefore, the removable transfer unit 75 may not include the first transfer rollers 54. The removable transfer unit 75 may also include the second transfer roller 55.

Other Modifications

While an exemplary embodiment of the present disclosure has been described above, the present disclosure is not limited to the configuration described in relation to the first exemplary embodiment described above, and a variety of modifications and implementations may be made without departing from the scope and spirit of the present disclosure.

Therefore, the present disclosure may also include the following modifications etc., for example.

Figure 9A:
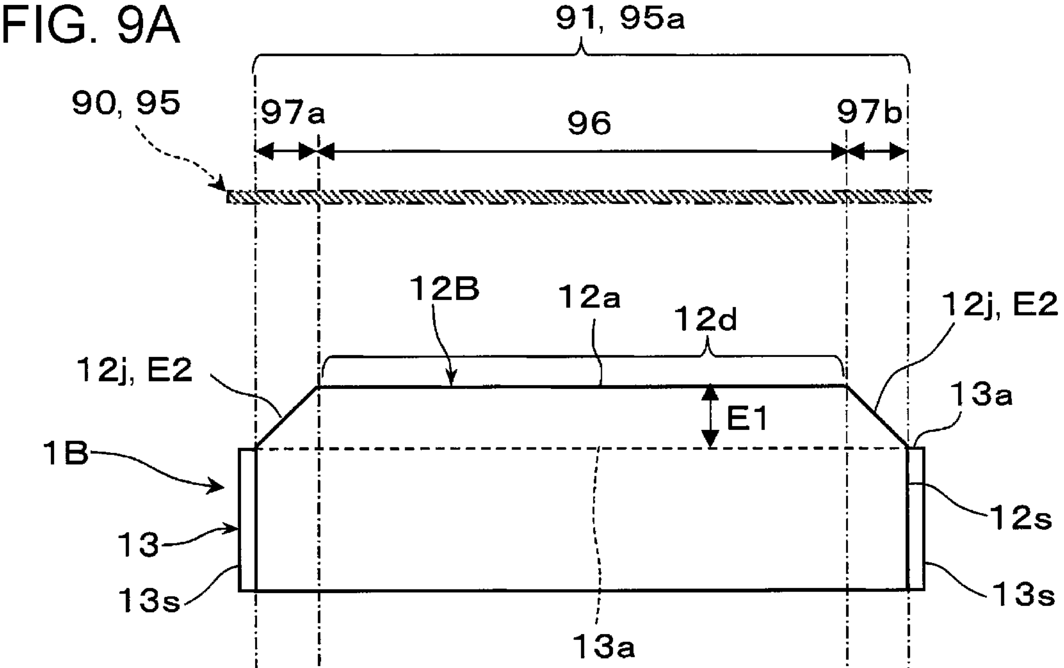
FIG. 9A illustrates an overview of a cleaning member according to a first modification.
Figure 9B:
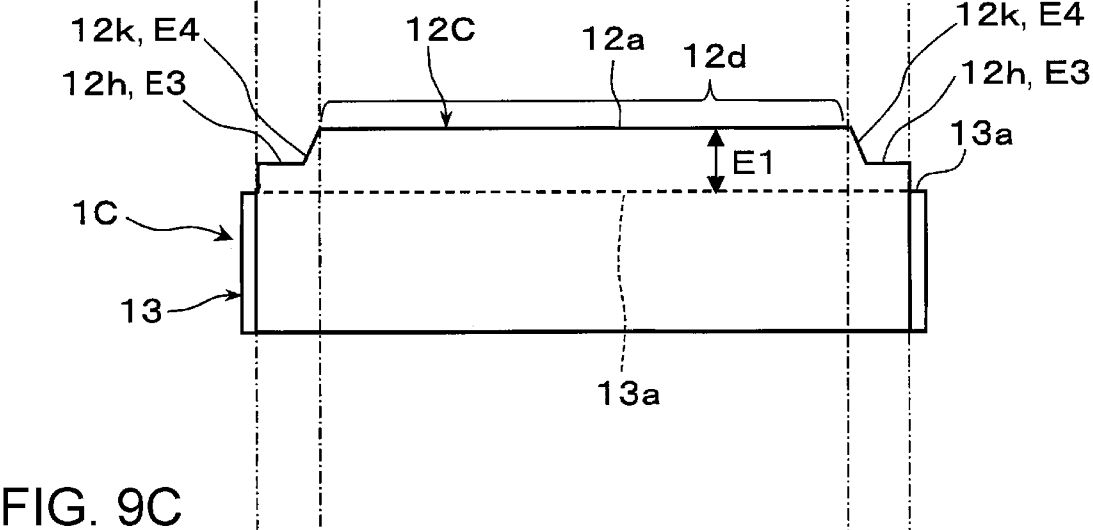
FIG. 9B illustrates an overview of a cleaning member according to a second modification.
Figure 9C:
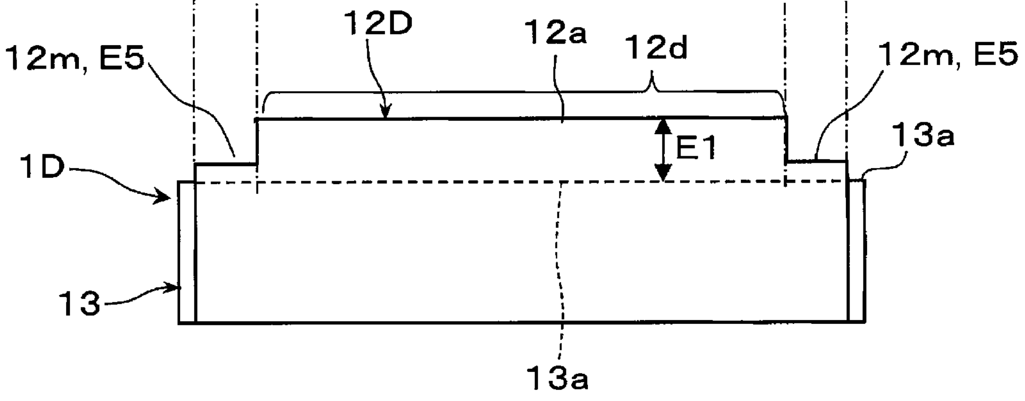
FIG. 9C illustrates an overview of a cleaning member according to a third modification.

When the cleaning target body 90 is an image holding member 95 (such as a photoconductor or an intermediate transfer body) that includes an image holding surface 95*a* that holds an image composed of toner and corresponds to the cleaning target surface 91, an effective image holding region 96 is occasionally set on the image holding surface 95*a* as the cleaning target surface 91 as illustrated in FIGS. 9A to 9C.

In this case, the amount of projection E of the distal end surface 12*a* of the elastic contact plate 12 of the cleaning member 1 which cleans the image holding surface 95*a* of the image holding member 95 may be rendered partially different.

That is, the amount of projection E may be determined such that, as illustrated in FIGS. 9A to 9C, the amount of projection (P2 to P5) of two end portions (12*j*, 12*h*, 12*k*, 12*m*) of the elastic contact plate 12 that contact regions 97*a*, 97*b* on the outer side of the effective image holding region 96, of the cleaning target surface 91 of the image holding surface 95*a* of the image holding member 95 to be cleaned, is less than an amount of projection E1 of a portion 12*d* of the elastic contact plate 12 that contacts the effective image holding region 96.

In the case where the amount of projection of the two end portions of the elastic contact plate 12 is less than the amount of projection E1, the force with which the two end portions contact the cleaning target surface 91 being moved during cleaning is relatively reduced, and the drawing force received from the cleaning target surface 91 is also relatively reduced.

The effective image holding region 96 is a region in which an image (including a latent image) that constitutes an image composed of toner may be held.

The regions 97*a*, 97*b* on the outer side of the effective image holding region 96 are regions that are adjacently on both outer sides (or one outer side) of the effective image holding region 96 in a direction that is substantially orthogonal to the moving direction of the cleaning target surface 91. The outer regions 97*a*, 97*b* may be regions in which an image (e.g. a pattern image for control) that does not finally constitute an image is held, or may be regions in which no image is held at all, for example.

In a cleaning member 1B according to a first modification illustrated in FIG. 9A, the two end portions 12*j* of the elastic contact plate 12 which are elastically deformed to contact the outer regions 97*a*, 97*b* of the image holding surface 95*a* during cleaning are formed to have oblique distal end surfaces inclined to be gradually closer to the distal end surface 13*a* of the support plate 13 from the portion 12*d* of the elastic contact plate 12 which contacts the effective image holding region 96.

An amount of projection E2 of the two end portions 12*j* composed of oblique distal end surfaces is an amount of projection gradually decreased away from the portion 12*d* of the elastic contact plate 12 which contacts the effective image holding region 96.

The two end portions 12*j* composed of oblique distal end surfaces contact the image holding surface 95*a* during cleaning to a lesser degree at portions that are closer to the distal end surface 13*a* of the support plate 13.

In a cleaning member 1C according to a second modification illustrated in FIG. 9B, the two end portions of the elastic contact plate 12 which are elastically deformed to contact the outer regions 97*a*, 97*b* of the image holding surface 95*a* during cleaning are formed to have a first projection surface 12*h* with a constant amount of projection E3 (<E1) that is less than the amount of projection E1 of the portion 12*d* of the elastic contact plate 12 which contacts the effective image holding region 96, and a second oblique distal end surface 12*k* inclined to be gradually closer to the first projection surface 12*h* from the portion 12*d* of the elastic contact plate 12 which contacts the effective image holding region 96.

The amount of projection E3 of the two end portions composed of the first projection surface 12*h* is a constant amount of projection that is less than the amount of projection E1. The amount of projection E4 of the two end portions composed of the second oblique distal end surface 12*k* is an amount of projection gradually decreased away from the portion 12*d* of the elastic contact plate 12 which contacts the effective image holding region 96.

The two end portions composed of the first projection surface 12*h* contact the image holding surface 95*a* during cleaning to a lesser degree as the amount of projection E3 is smaller.

In a cleaning member 1D according to a third modification illustrated in FIG. 9C, the two end portions 12*m* of the elastic contact plate 12 which are elastically deformed to contact the outer regions 97*a*, 97*b* of the image holding surface 95*a* during cleaning are formed to have a third projection surface with a constant amount of projection E5 (<E1) that is less than the amount of projection E1 of the portion 12*d* of the elastic contact plate 12 which contacts the effective image holding region 96.

The amount of projection E5 of the two end portions 12*m* composed of the third projection surface is a constant amount of projection that is less than the amount of projection E1.

The two end portions 12*m* composed of the third projection surface contact the image holding surface 95*a* during cleaning to a lesser degree as the amount of projection E5 is smaller.

Figure 10A:
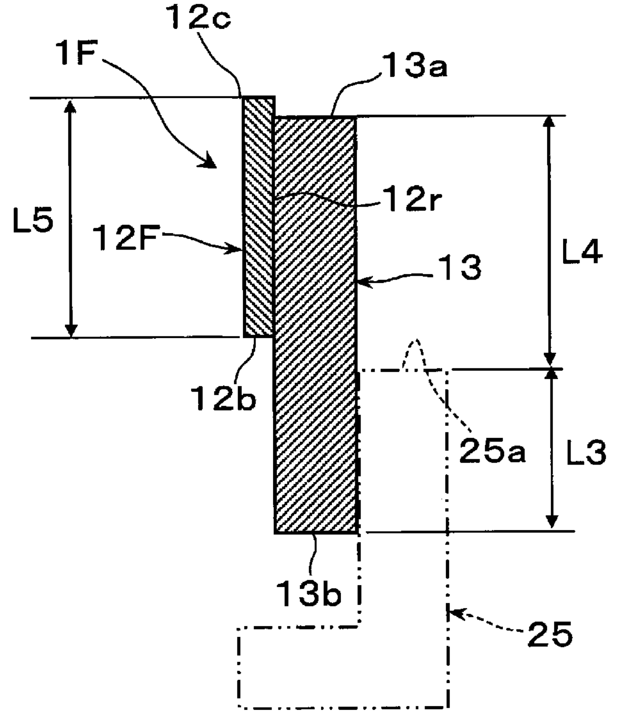
FIG. 10A schematically illustrates a cross section of a cleaning member according to a fourth modification.

The cleaning member 1 may be constituted as a cleaning member 1F that includes, as the elastic contact plate 12, an elastic contact plate 12F, the rear end surface 12*b* of which is in a misaligned state to be located on the inner side with respect to the rear end surface 13*b* of the support plate 13 (the elastic contact plate 12 is shorter than the support plate 13) as illustrated in FIG. 10A, rather than the state (see FIG. 2) in which the rear end surface 12*b* is aligned with the rear end surface 13*b* of the support plate 13.

In this case, the rear end surface 12*b* of the elastic contact plate 12F may be in a misaligned state to be located on the inner side with respect to a portion of the support plate 13 for the length L3 supported by the holding member 22 (the elastic contact plate 12 is terminated in a portion of the support plate 13 for the length L4 not supported by the holding member 22).

Figure 10B:
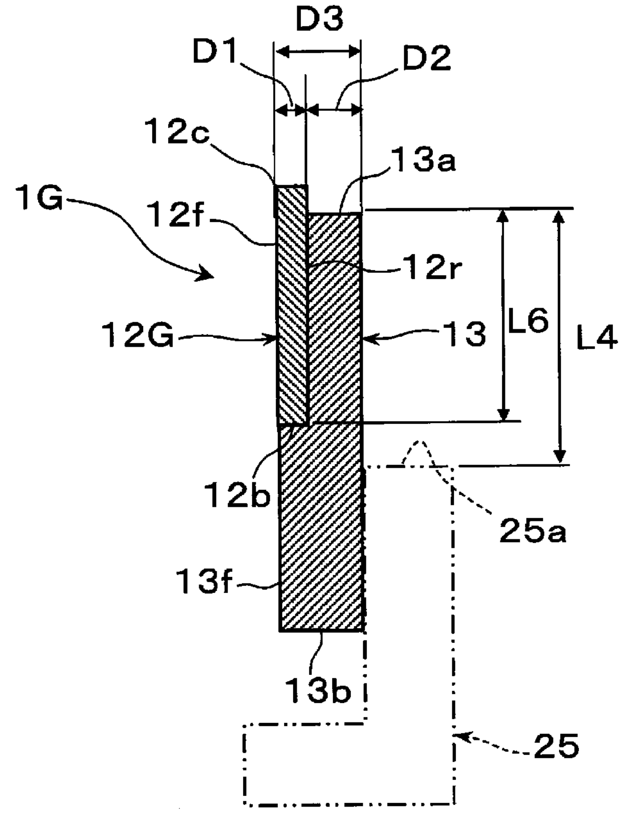
FIG. 10B schematically illustrates a cross section of a cleaning member according to a fifth modification.

The cleaning member 1 may be constituted as a cleaning member 1G that includes, as the elastic contact plate 12, an elastic contact plate 12G bonded with the back surface 12*r* supported by a stepped portion formed at the distal-end portion of the support plate 13 on the side of the distal end surface 13*a* as illustrated in FIG. 10B.

In this case, the elastic contact plate 12G is bonded to the stepped portion of the support plate 13 except for the projecting portion 12*g*. The elastic contact plate 12G may be attached such that the belly surface 12*f* is flush with a belly surface 13*f* of the support plate 13 as illustrated in FIG. 10B.

In the cleaning member 1G including the elastic contact plate 12G attached to the stepped portion of the support plate 13, the plate thickness D3 of the entire cleaning member 1G may be reduced compared to the case where the elastic contact plate 12 is attached to the support plate 13 having no stepped portion with respective surfaces of the elastic contact plate 12 and the support plate 13 overlapping each other (see FIG. 2).

In the image forming apparatus 3, the cleaning device 2 which includes the cleaning member 1 as illustrated in FIG. 7 may be used as the cleaning device 46 (cleaning device 46 not included as a part of the removable unit 7) of the imaging unit 40A, 40B, 40C, 40D.

In the image forming apparatus 3, the cleaning target body 90 to be cleaned by the cleaning device 2 may be a constituent component other than the intermediate transfer body 51 (including one of a drum type) or the photoconductor 41 (including one of a belt type).

The image forming apparatus according to the present disclosure is not limited to the image forming apparatus 3 that forms a multi-color image indicated in relation to the first exemplary embodiment, and it is only necessary that the image forming apparatus should include the cleaning device 2. Other examples of the image forming apparatus include an image forming apparatus of any other type that forms a multi-color image, and an image forming apparatus of a type that forms a single-color image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A cleaning member comprising: an elastic contact plate that includes a distal end surface with a corner portion to be brought into contact with a cleaning target surface, which is moved with toner attached thereto, of a cleaning target body; and a support plate bonded to the elastic contact plate from a back surface side of the elastic contact plate to support the elastic contact plate, the support plate being more rigid than the elastic contact plate, wherein the distal end surface of the elastic contact plate projects from a distal end surface of the support plate.

(((2)))

The cleaning member according to (((1))), wherein an amount of projection of the distal end surface of the elastic contact plate is less than a plate thickness of the elastic contact plate.

(((3)))

The cleaning member according to (((2))), wherein the plate thickness of the elastic contact plate is less than a plate thickness of the support plate.

(((4)))

The cleaning member according to any one of (((1))) to (((3))), wherein a Young's modulus of the support plate is higher than a Young's modulus of the elastic contact plate.

(((5)))

The cleaning member according to any one of (((1))) to (((4))), wherein an amount of projection of the distal end surface of the elastic contact plate at two end portions of the distal end surface in a longitudinal direction is less than an amount of projection of the distal end surface at other portions.

(((6)))

A cleaning device comprising: a plate-like cleaning member that cleans a cleaning target surface, which is moved with toner attached thereto, of a cleaning target body by scraping the toner with the cleaning member contacting the cleaning target surface; and a holding member that holds the cleaning member such that a corner portion of a distal end surface of the cleaning member contacts the cleaning target surface, wherein the cleaning member is the cleaning member according to any one of (((1))) to (((5))).

(((7)))

A removable unit that is removably mountable to an image forming apparatus that forms an image composed of toner, comprising:

a cleaning target body that includes a cleaning target surface that is moved with toner attached thereto; and the cleaning device according to (((6))).

(((8)))

An image forming apparatus comprising: an image forming portion that forms an image composed of toner on a recording medium; and the cleaning device according to (((6))).

(((9)))

The image forming apparatus according to (((8))), wherein the cleaning target body is an image holding member that includes an image holding surface that holds an image composed of toner, and an amount of projection of the distal end surface of the elastic contact plate at two end portions at which the distal end surface contacts a region on an outer side of an effective image holding region of the image holding surface of the image holding member is less than an amount of projection of the distal end surface at a portion at which the distal end surface contacts the effective image holding region.

(((10)))

An image forming apparatus comprising: an image forming portion that forms an image composed of toner on a recording medium; and the removable unit according to (((7))), which constitutes a part of the image forming portion.

(((11)))

The image forming apparatus according to (((10))), wherein the cleaning target body of the removable unit is an image holding member that includes an image holding surface, and an amount of projection of the distal end surface of the elastic contact plate at two end portions at which the distal end surface contacts a region on an outer side of an effective image holding region of the image holding surface of the image holding member is less than an amount of projection of the distal end surface at a portion at which the distal end surface contacts the effective image holding region.

What is claimed is:

1. A cleaning member comprising:

an elastic contact plate that includes a distal end surface with a corner portion to be brought into contact with a cleaning target surface, which is moved with toner attached thereto, of a cleaning target body; and a support plate bonded to the elastic contact plate from a back surface side of the elastic contact plate to support the elastic contact plate, the support plate being more rigid than the elastic contact plate, wherein the distal end surface of the elastic contact plate projects from a distal end surface of the support plate, wherein an amount of projection of the distal end surface of the elastic contact plate at two end portions of the distal end surface in a longitudinal direction is less than an amount of projection of the distal end surface at other portions, and wherein a length by which the elastic contact plate at the two end portions contact with the cleaning target body is shorter than a length by which the elastic contact plate at the other portions contacts with the cleaning target body.

2. The cleaning member according to claim 1, wherein an amount of projection of the distal end surface of the elastic contact plate is less than a plate thickness of the elastic contact plate.

3. The cleaning member according to claim 2, wherein the plate thickness of the elastic contact plate is less than a plate thickness of the support plate.

4. The cleaning member according to claim 1, wherein a Young's modulus of the support plate is higher than a Young's modulus of the elastic contact plate.

5. The cleaning member according to claim 1, wherein the elastic contact plate comprises an inclined surface at the two end portions of the distal end surface.

6. The cleaning member according to claim 1, wherein the elastic contact plate comprises a flat surface at the two end portions of the distal end surface.

7. A cleaning device comprising:

a plate-like cleaning member that cleans a cleaning target surface, which is moved with toner attached thereto, of a cleaning target body by scraping the toner with the cleaning member contacting the cleaning target surface; and a holding member that holds the cleaning member such that a corner portion of a distal end surface of the cleaning member contacts the cleaning target surface, wherein the cleaning member is the cleaning member according to claim 1.

8. A cleaning device comprising:

a plate-like cleaning member that cleans a cleaning target surface, which is moved with toner attached thereto, of a cleaning target body by scraping the toner with the cleaning member contacting the cleaning target surface; and a holding member that holds the cleaning member such that a corner portion of a distal end surface of the cleaning member contacts the cleaning target surface, wherein the cleaning member is the cleaning member according to claim 2.

9. A cleaning device comprising:

a plate-like cleaning member that cleans a cleaning target surface, which is moved with toner attached thereto, of a cleaning target body by scraping the toner with the cleaning member contacting the cleaning target surface; and a holding member that holds the cleaning member such that a corner portion of a distal end surface of the cleaning member contacts the cleaning target surface, wherein the cleaning member is the cleaning member according to claim 3.

10. A cleaning device comprising:

a plate-like cleaning member that cleans a cleaning target surface, which is moved with toner attached thereto, of a cleaning target body by scraping the toner with the cleaning member contacting the cleaning target surface; and a holding member that holds the cleaning member such that a corner portion of a distal end surface of the cleaning member contacts the cleaning target surface, wherein the cleaning member is the cleaning member according to claim 4.

11. A removable unit that is removably mountable to an image forming apparatus that forms an image composed of toner, comprising:

a cleaning target body that includes a cleaning target surface that is moved with toner attached thereto; and the cleaning device according to claim 7.

12. A removable unit that is removably mountable to an image forming apparatus that forms an image composed of toner, comprising:

a cleaning target body that includes a cleaning target surface that is moved with toner attached thereto; and the cleaning device according to claim 8.

13. A removable unit that is removably mountable to an image forming apparatus that forms an image composed of toner, comprising:

a cleaning target body that includes a cleaning target surface that is moved with toner attached thereto; and the cleaning device according to claim 9.

14. A removable unit that is removably mountable to an image forming apparatus that forms an image composed of toner, comprising:

a cleaning target body that includes a cleaning target surface that is moved with toner attached thereto; and the cleaning device according to claim 10.

15. A removable unit that is removably mountable to an image forming apparatus that forms an image composed of toner, comprising:

a cleaning target body that includes a cleaning target surface that is moved with toner attached thereto; and the cleaning member according to claim 1.

16. An image forming apparatus comprising:

an image forming portion that forms an image composed of toner on a recording medium; and the cleaning device according to claim 7.

17. An image forming apparatus comprising:

an image forming portion that forms an image composed of toner on a recording medium; and the cleaning device according to claim 8.

18. The image forming apparatus according to claim 16, wherein the cleaning target body is an image holding member that includes an image holding surface that holds an image composed of toner, and an amount of projection of the distal end surface of the elastic contact plate at two end portions at which the distal end surface contacts a region on an outer side of an effective image holding region of the image holding surface of the image holding member is less than an amount of projection of the distal end surface at a portion at which the distal end surface contacts the effective image holding region.

19. An image forming apparatus comprising:

an image forming portion that forms an image composed of toner on a recording medium; and the removable unit according to claim 11, which constitutes a part of the image forming portion.

20. The image forming apparatus according to claim 19, wherein the cleaning target body of the removable unit is an image holding member that includes an image holding surface, and an amount of projection of the distal end surface of the elastic contact plate at two end portions at which the distal end surface contacts a region on an outer side of an effective image holding region of the image holding surface of the image holding member is less than an amount of projection of the distal end surface at a portion at which the distal end surface contacts the effective image holding region.

* * * * *